US008819421B2

(12) United States Patent  
Krasnyanskiy et al.

(10) Patent No.: US 8,819,421 B2
(45) Date of Patent: Aug. 26, 2014

(54) FILE DECRYPTION INTERFACE

(75) Inventors: Maksim Krasnyanskiy, San Diego, CA (US); Christopher R. Wingert, Del Mar, CA (US); Pooja Aggarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 884 days.

(21) Appl. No.: 11/692,099

(22) Filed: Mar. 27, 2007

(65) Prior Publication Data

US 2007/0260881 A1    Nov. 8, 2007

Related U.S. Application Data

(60) Provisional application No. 60/789,264, filed on Apr. 4, 2006.

(51) Int. Cl.
*G06F 21/00* (2013.01)
*G06F 21/60* (2013.01)
*G06F 21/62* (2013.01)

(52) U.S. Cl.
CPC .......... *G06F 21/602* (2013.01); *G06F 21/6218* (2013.01)
USPC ....................................................... 713/165

(58) Field of Classification Search
USPC .............................. 713/165, 167, 193; 726/26
See application file for complete search history.

(56) References Cited

U.S. PATENT DOCUMENTS

| | | | |
|---|---|---|---|
| 2003/0091186 A1* | 5/2003 | Fontijn et al. ............... | 380/201 |
| 2003/0115147 A1* | 6/2003 | Feldman et al. ............. | 705/64 |
| 2003/0172270 A1* | 9/2003 | Newcombe et al. ......... | 713/168 |
| 2003/0208686 A1* | 11/2003 | Thummalapally et al. ... | 713/193 |
| 2005/0114689 A1* | 5/2005 | Strom et al. ................. | 713/193 |
| 2006/0265758 A1* | 11/2006 | Khandelwal et al. ........ | 726/27 |
| 2007/0011469 A1* | 1/2007 | Allison et al. ............... | 713/193 |

FOREIGN PATENT DOCUMENTS

| | | |
|---|---|---|
| JP | 2001516913 T | 10/2001 |
| JP | 2002312222 A | 10/2002 |
| JP | 2003115831 A | 4/2003 |
| JP | 2004302930 A | 10/2004 |

OTHER PUBLICATIONS

ADONIS: "Cryptography Types of ciphers" INET, (Online) May 27, 2005, XP002454122.
International Search Report—PCT/US07/066006, International Search Authority—European Patent Office—Nov. 6, 2007.
Written Opinion—PCT/US07/066006, International Searching Authority—European Patent Office, Nov. 6, 2007.
Taiwanese Search Report—096112214—TIPO—Dec. 10, 2010.

* cited by examiner

*Primary Examiner* — Vu Le
*Assistant Examiner* — Tracy Mangialaschi
(74) *Attorney, Agent, or Firm* — Arent Fox LLP

(57) ABSTRACT

Systems and methodologies are described that facilitate digital rights management in a wireless communication environment. Generally, content (e.g., data files, video images, etc.) can be downloaded and maintained in its encrypted state to ensure protection of digital rights. Consequently, programming applications that utilize such content decrypt the content at the time of use (e.g., playback or access). A file interface can be provided that allows applications to access encrypted content utilizing a standardized file I/O interface. Decryption of content can be transparent to individual applications utilizing encrypted content. Therefore, modifications cryptographic algorithms or procedures and changes in key sizes need not affect the programming applications.

34 Claims, 13 Drawing Sheets

FILE DECRYPTION INTERFACE

This application claims the benefit of U.S. Provisional Application Ser. No. 60/789,264 entitled "BLOCK DECRYPTION IN DMSS VIRTUAL FILE I/O INTERFACE," filed on Apr. 4, 2006. The entirety of the above-referenced application is incorporated herein by reference.

BACKGROUND

I. Field

The following description relates generally to content protection, and, amongst other things, to decryption of data.

II. Background

Wireless networking systems have become a prevalent means by which a majority of people worldwide have come to communicate. Wireless communication devices have become smaller and more powerful in order to meet consumer needs and to improve portability and convenience. Consumers have become dependent upon wireless communication devices such as cellular telephones, personal digital assistants (PDAs) and the like, demanding reliable service, expanded areas of coverage and increased functionality.

One such function is the distribution of data intensive content such as video content. Consumers have become used to high levels of service in terms of availability, management, access control and device capabilities based upon their experiences with existing technologies (e.g., television, the Internet). Provision of data intensive content that meets these expectations includes many challenges.

One such challenge is protection of the content during and after distribution. Content providers typically require that a content distribution system have the ability to provide Digital Rights Management (DRM), which refers to any of several technical arrangements that provide control of distributed material on electronic devices with such measures installed. An underlying component for content distribution systems is encryption/decryption of media. DRM software can provide the underlying encryption/decryption algorithms, hashing and authentication algorithm implementations used by both clients and servers. DRM software can also provide for license management and secure storage of content.

DRM can utilize two types of cryptosystems or cryptography techniques, symmetric cryptography and asymmetric cryptography. In symmetric key cryptography, a single key is used for both encryption and decryption of data. Examples of symmetric cryptography algorithms include Data Encryption Standard (DES) and Advanced Encryption Standard (AES) systems. In asymmetric cryptography, also known as public-key cryptography, each user may have a public key and a private key. Encryption is performed with the public key while decryption is performed with the private key. Examples of asymmetric cryptography include the Rivest, Shamir and Adleman (RSA) algorithm and Elliptic Curve Cryptography (ECC). Although decryption utilizing symmetric key cryptography algorithms is significantly faster than decryption utilizing asymmetric key cryptography algorithms, symmetric key cryptography requires communication of shared keys between the communicating entities. In asymmetric cryptography, an entity can distribute its public key to other entities allowing any such entity to encrypt data utilizing the public key. However, the encrypted data can be decrypted only with the private key maintained by the entity that distributed the public key. While asymmetric cryptography is computationally expensive, it does not require secure distribution of shared keys between entities desiring secure communication.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating decryption of data content. Generally, content (e.g., data files, video images, etc.) can be transferred and maintained in its encrypted state to ensure protection of digital rights. Consequently, programming applications that utilize such content decrypt the content at the time of use (e.g., playback or access). A file interface can be provided that allows applications to access encrypted content utilizing a standardized file interface. Consequently, decryption of content can be transparent to individual applications utilizing encrypted content. Modifications to encryption or decryption algorithms or procedures need not affect the programming applications.

In an aspect, a method that facilitates digital rights management that comprises receiving a request to open an encrypted file from an application, generating a file handle for the file and associating key material related to the file with the file handle for use in file I/O operations.

In another aspect, an apparatus that facilitates digital rights management that comprises a memory that stores an encrypted file and a processor that executes instructions for accessing the encrypted file in response to file I/O requests from an application based at least in part upon key material associated with the encrypted file.

According to yet another aspect, an apparatus that facilitates digital rights management that comprises means for receiving a file I/O request from at least one programming application, means for accessing an encrypted file in response to the file I/O request, means for utilizing key material associated with the file to decrypt data from the encrypted file, and means for supplying decrypted data to the application.

According to another aspect, a computer-readable medium having instructions for receiving a file read request from a programming application for an encrypted file, obtaining data from the encrypted file as a function of the read request, decrypting the obtained data based at least in part upon a key associated with the encrypted file, and supplying the decrypted data to the programming application.

Yet another aspect relates to a processor that executes computer-executable instructions for accepting a file open directive for an encrypted file from a programming application, generating a file reference for the encrypted file, associating a key related to the encrypted file with the file reference, and supplying the programming application with the file reference for use in file I/O.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various

DETAILED DESCRIPTION

Figure 1:
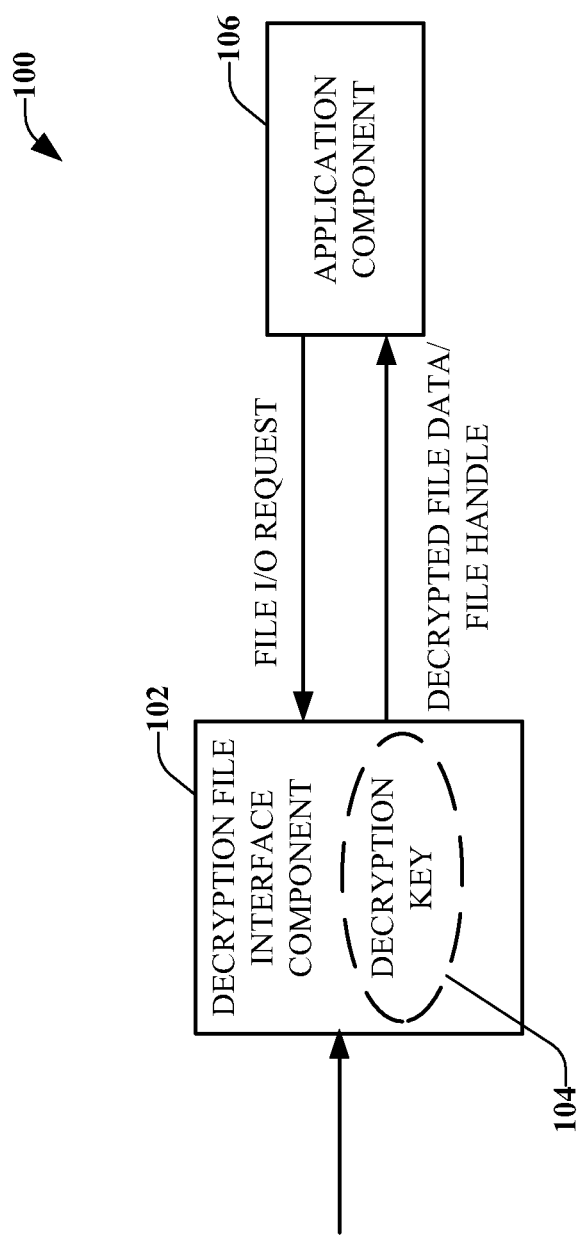
FIG. 1 is a block diagram of a system that facilitates decryption of encrypted content according to one or more aspects presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, user terminal, terminal, user agent, or user equipment (UE). A user device can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Wireless communications systems provide for distribution of large volumes of content. For example, Forward Link Only (FLO) technology has been developed by an industry group of wireless communication service providers to utilize the latest advances in system design to achieve the highest-quality performance. FLO technology is intended for a mobile multimedia environment and is suited for use with mobile user devices. FLO technology is designed to achieve high quality reception, both for real-time content streaming and other data services. FLO technology can provide robust mobile performance and high capacity without compromising power consumption. In addition, the technology reduces the network cost of delivering multimedia content by decreasing the number of base station transmitters that are needed to be deployed. FLO technology based multimedia multicasting is also complimentary to the wireless operators' cellular network data and voice services, delivering content to the same mobile devices. The FLO wireless system has been designed to broadcast real time audio and video signals, as well as non-real time services.

The availability of transmission systems such as the FLO wireless system allows for delivery of data intensive content, such as video to wireless user devices. Ease of distribution of such content raises concerns regarding control of distribution of content. Sophisticated DRM software can utilize available encryption algorithms and control key distribution to manage access and rights to one or more encrypted files for multiple applications. For instance, users may have viewing rights, but may not be able to create additional copies of content. Additionally, access to content can by limited in time or by number of permitted accesses. Content should be protected not only during transmission to a user device, but even after the content has been received. Generally, content may be maintained in its encrypted state to ensure protection of digital rights. One DRM technique utilizes control of decryption keys to manage access and rights to the encrypted content.

Encrypted content can be decrypted before it can be utilized by various applications. However, existing applications may lack the capability or information to successfully decrypt content. Additionally, encryption standards are likely to change to reflect advances in technology. Different algorithms may become popular. Additionally, key length may increase to enhance security of encryption. Key length, also referred to as key size, is a measure of the number of possible keys that can be used in a particular cipher or cryptographic algorithm. Generally, key length is specified in bits. If each individual application handles content decryption independently, each application may require individual updates to support encryption. Requiring individual updates increases the time necessary to ensure that all applications are properly modified for changes in encryption. In addition, separate updates increase the likelihood of errors or of an application being missed during the update procedure.

With reference now to the drawings, FIG. 1 illustrates a block diagram of a system 100 that facilitates decryption of encrypted content based upon standard file input/output (I/O) operations. System 100 includes a decryption file interface component 102 that utilizes a decryption key 104 to decrypt data obtained from an encrypted file (not shown). Decryption file interface component 102 acts as a file I/O interface layer that provides standard file I/O operations to a programming application component 106. For example, decryption file interface component 102 can provide decrypted data from encrypted files in response to read requests. Application component 106 can utilize standard file I/O operations to obtain data by invoking decryption file interface component 102.

To facilitate utilizing an encrypted file, the decryption file interface component 102 can obtain decryption key 104 when the file is opened and the file handle is generated. As used herein, a file handle or file descriptor is a reference to a file. The file handle or descriptor is used by an application component 106 to indicate a specific file. As depicted, decryption file interface component 102 can receive a file I/O request, such as a file open request. Decryption file interface component 102 can obtain the decryption key and generate a file handle to return to the application component 106. In addition, decryption file interface component 102 can receive a read request including the file handle, obtain the encrypted data based upon the read request, utilize decryption key 104 associated with the file handle to decrypt the data and return the decrypted data to application component 106.

In embodiments, decryption file interface component 102 can provide for key management. For example, decryption file interface component 102 can obtain decryption keys, obtain key updates, determine key expiration and the like. The decryption file interface 102 can communicate with a server or base station (not shown) to obtain keys necessary for decryption of encrypted files. Decryption file interface component 102 can include logic necessary for managing multiple keys and key/file relationships.

Figure 2:
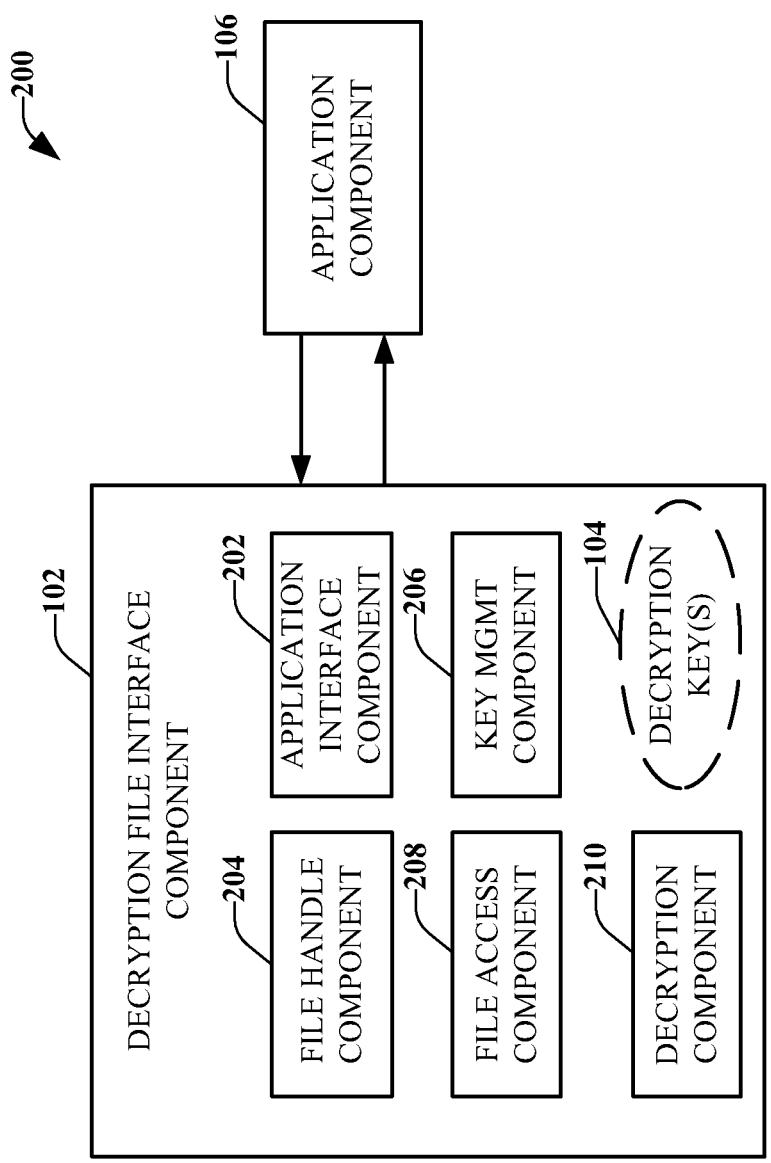
FIG. 2 is a more detailed block diagram of a system that facilitates decryption of encrypted content according to one or more aspects presented herein.

Referring now to FIG. 2, a more detailed illustration of a system 200 for file decryption is illustrated. Decryption file interface component 102 can include an application interface component 202 that receives file I/O requests from one or more application components 106. File I/O requests can include standard file access operations including, but not limited to, file open, file close, file read, and file seek. The application interface component 202 can respond based upon the received request. For example, if a file open request is received, a file handle component 204 can generate a file handle or reference to the file to be opened. Application interface component 202 can provide the application 106 with the file handle, for use in further file I/O operations. In addition, the file open request can include key material for the encrypted file. A key management component 206 can associate the received key material with the generated file handle.

For a file read operation, application interface component 202 can receive a file read request from an application. The read request can include the file handle that identifies the file and the number of blocks or amount of data to read from the file. A file access component 208 can retrieve the appropriate amount of data from the file based upon the read request. The key management component 206 can identify the key material associated with the file based upon the file handle. A decryption component 210 can decrypt the retrieved data utilizing the key material before the data is provided to the application component 106 by the application interface component 202.

Figure 3:
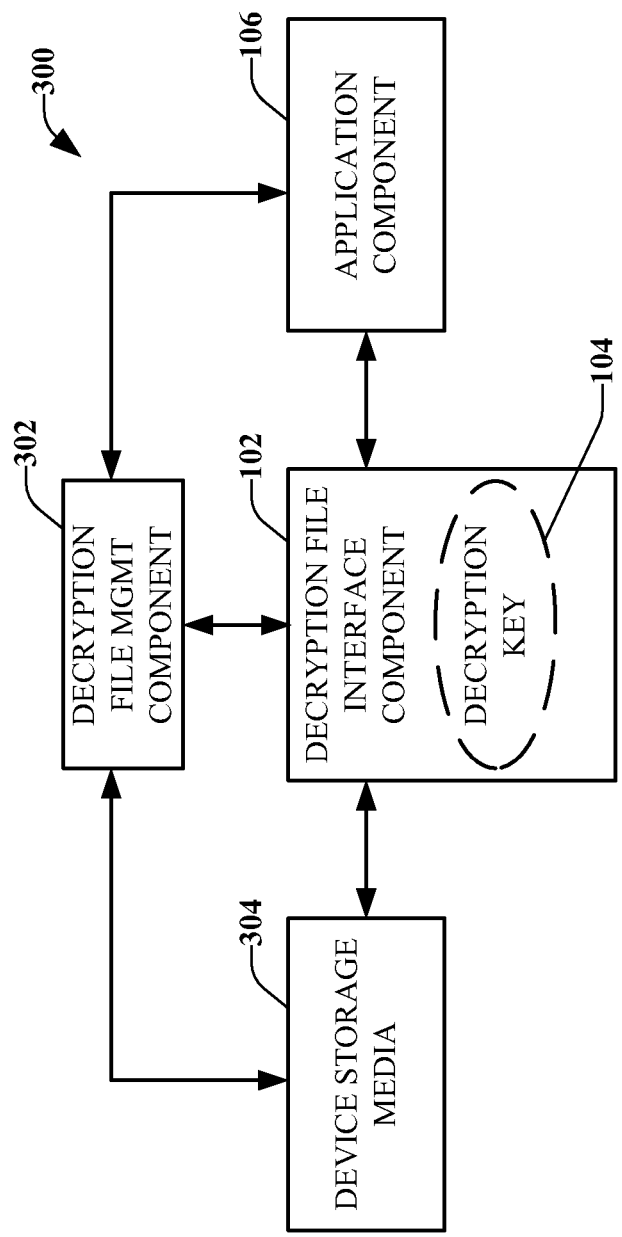
FIG. 3 is a block diagram of a system that facilitates utilization of encrypted content according to one or more aspects presented herein.

Turning now to FIG. 3, illustrates a system 300 for decryption of files for one or more applications. System 300 includes a decryption file management component 302 that obtains and/or manages one or more keys or key materials that can be utilized to decrypt files. In particular, decryption file management component 302 can obtain one or more keys provided with content as metadata. Alternatively, keys can be independently obtained from the source of content, such as a server or base station (not shown). The decryption file management component 302 can maintain one or more keys and as well as information regarding the relationships of various keys to encrypted content maintained within a device storage media 304. Decryption file management component 302 can include logic that handles key updates, expiration of keys, requests for keys and the like.

Application 106 can utilize standard I/O operations to invoke decryption file interface component 102 and obtain content maintained by device storage media 304. Decryption file interface component 102 accesses device storage media 304 to obtain the data requested by application 106. If the retrieved data is encrypted, decryption file interface component 102 can utilize decryption key 104 obtained via decryption file management component 302 to decrypt data obtained from device storage media. The decrypted data can be provided to programming application 106. The decryption process can be transparent to application 106. Consequently, application 106 is unaffected by changes to decryption of the data. However, application 106 attempting to access encrypted content directly may experience errors since read operations that do not utilize the decryption file interface component 102 do not decrypt the data.

Figure 4:
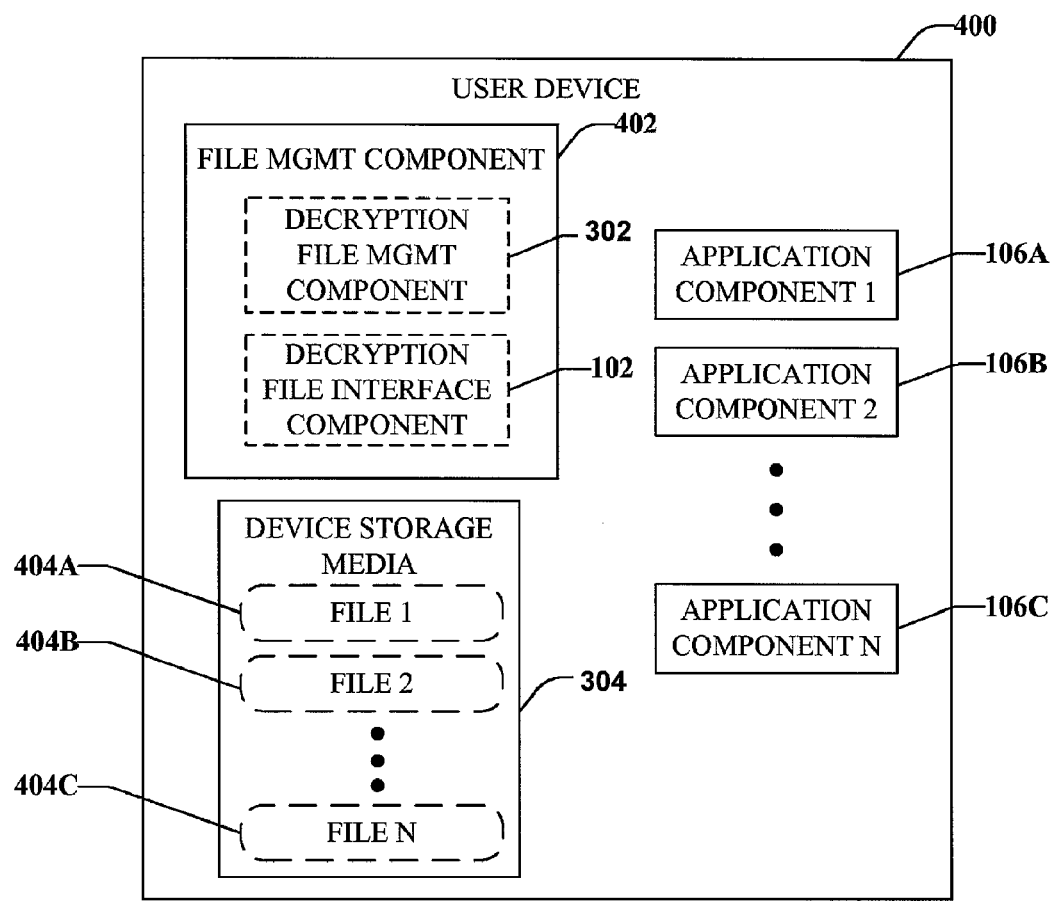
FIG. 4 is a block diagram of a user device that facilitates decryption of encrypted content according to one or more aspects presented herein.

Referring now to FIG. 4, a block diagram of a user device 400 that facilitates file decryption is illustrated. User device 400 can include one or more applications 106A-106C. For instance, applications can include any software applications, such as a media player, Internet browser and the like. Such applications may utilize data files 404A-404C maintained within device storage media 304. Any number of applications can utilize file I/O operations as provided by the decryption file interface component to access data maintained by device storage media.

When content is received by user device 400, the content can be stored within device storage media 304 for use by applications 106A-106C. Any number of files 404A-404C can be maintained by device storage media 304 and utilized by applications 106A-106C. User device 400 can include a file management component 402 capable of handling file access and security. File management component 402 can include decryption file management component 302 and decryption file interface component 102. File management component 402 can obtain one or more keys associated with encrypted files. Each file may be encrypted with a separate key. Alternatively, files may share a key. Decryption file management component 302 can manage relationships between the set of keys and the set of files.

Figure 5:
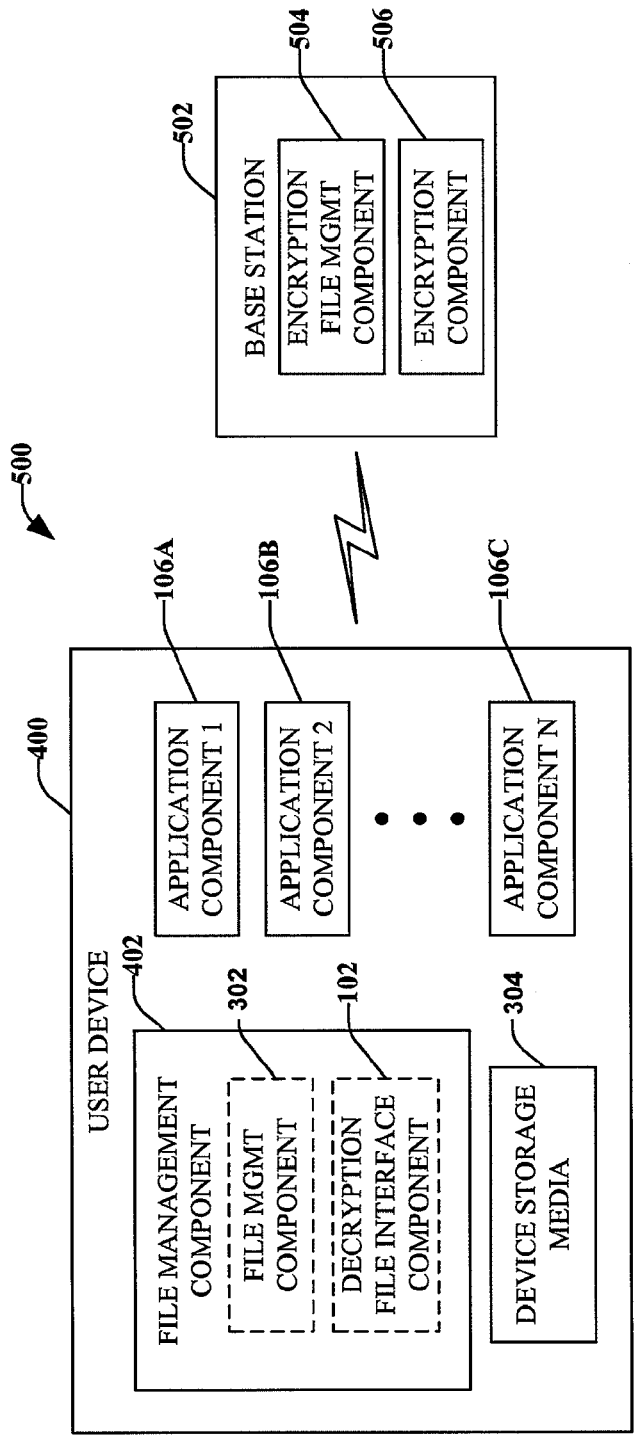
FIG. 5 is a block diagram of a wireless system that facilitates decryption of encrypted content according to one or more aspects presented herein.

Turning now to FIG. 5, a block diagram of a system 500 for efficient delivery of encrypted content is illustrated. System 500 can be, for example, a FLO system that takes as input service content and outputs content to a multitude of user devices. A FLO system can utilize both symmetric and asymmetric cryptography to protect content. Generally, asymmetric cryptography can be used to deliver symmetric keys securely. Symmetric cryptography can be used to perform the bulk of the encryption/decryption. Asymmetric cryptography can be used for message authentication.

System 500 can include one or more user devices 400 or mobile devices, such as a cellular phone, a smart phone, a laptop, a handheld communication device, handheld computing device, satellite radio, global positioning system, Personal Digital Assistant (PDA), and/or other suitable devices for communicating over a wireless communication network. User device 400 can communicate wirelessly with one or more base stations 502. Although a number of user devices and base stations can be included in a communication network, as will be appreciated, a single user device that receives and/or transmits communication data signals with a single base station is illustrated for purposes of simplicity.

Base station 502 can transmit one or more encrypted content to the user devices 400. Content may be encrypted by base station 502 prior to transmission. Base station 502 can include an encryption file management component 504 that can associate one or more keys with content and control provision of appropriate keys to user devices. In addition, base station 502 can include an encryption component 506 that can utilize associated keys to encrypt content prior to transmission to user devices 400. In particular, content including, but not limited to, video (e.g., MPEG4), audio, and data files can be encrypted using a symmetric key. The symmetric key can be encrypted using asymmetric key cryptography and transmitted as metadata along with the symmetric content. At user device 400, an asymmetric key can be used to decrypt the symmetric key. The symmetric key can be associated with the file by the decryption file management component 302 and used by the decryption file interface component 102 to decrypt content for one or more applications 106.

Figure 6:
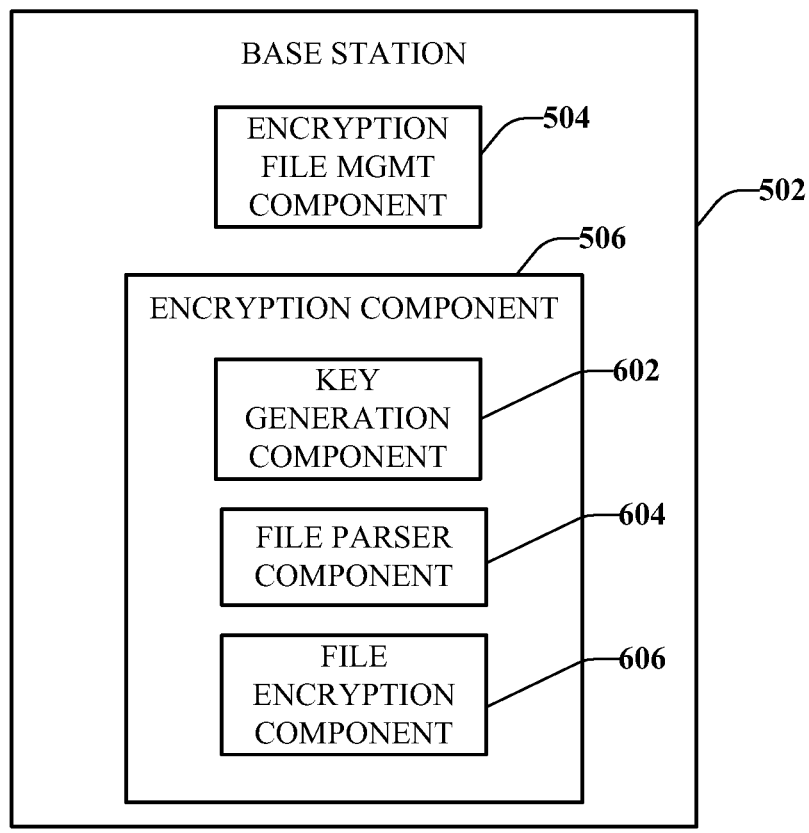
FIG. 6 is a block diagram of a base station that facilitates encryption of content according to one or more aspects presented herein.

FIG. 6 illustrates a base station 502, server or other system that facilitates encryption of data. Base station 502 can include an encryption file management component 504 that handles association of keys with data files as well as communication of keys to various user devices. Encryption component 506 can handle actual encryption of files. Encryption component 506 can include a key generation component 602 that is capable of generating symmetric and/or asymmetric keys. The keys may be of a fixed length or the key generation component 602 may provide for multiple key lengths.

Data files can be encrypted using various strategies. For instance, files can be encrypted based upon format of the file. A file parser component 604 can parse the source data file prior to encryption. In some embodiments, file parser component 604 can simply divide the source data file into blocks for encryption without regard to file format. A block can be a standard size portion of data (e.g., 512 bytes). Each block can be separately encrypted by a file encryption component 606 utilizing an associated key. Any block encryption algorithm can be utilized (e.g., AES, DES, Twofish, Blowfish, Anubis, CAST-128, CAST-256, CRYPTON and the like). Keys may be associated with the file by encryption file management component 504 and/or generated by key generation component 602. Individual encryption of file as a set of contiguous blocks provides for independence from file formats. Typically, data file formats change over time to allow for new features or more efficient storage of data. However, block encryption is independent of file format. Accordingly, block-based encryption and decryption may not need to be updated for new, updated or additional file formats.

Figure 7:
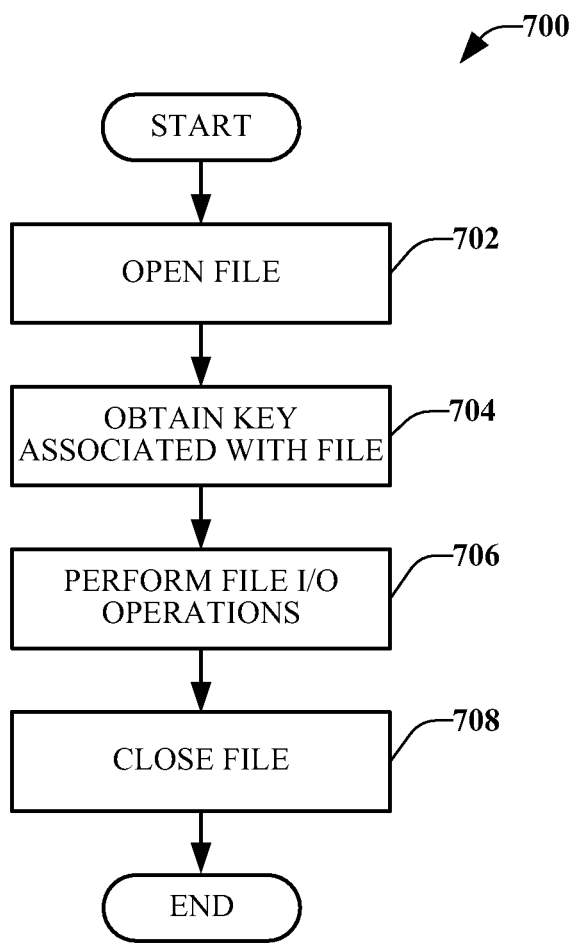
FIG. 7 illustrates a methodology for utilizing encrypted content in accordance with one or more aspects presented herein.
Figure 8:
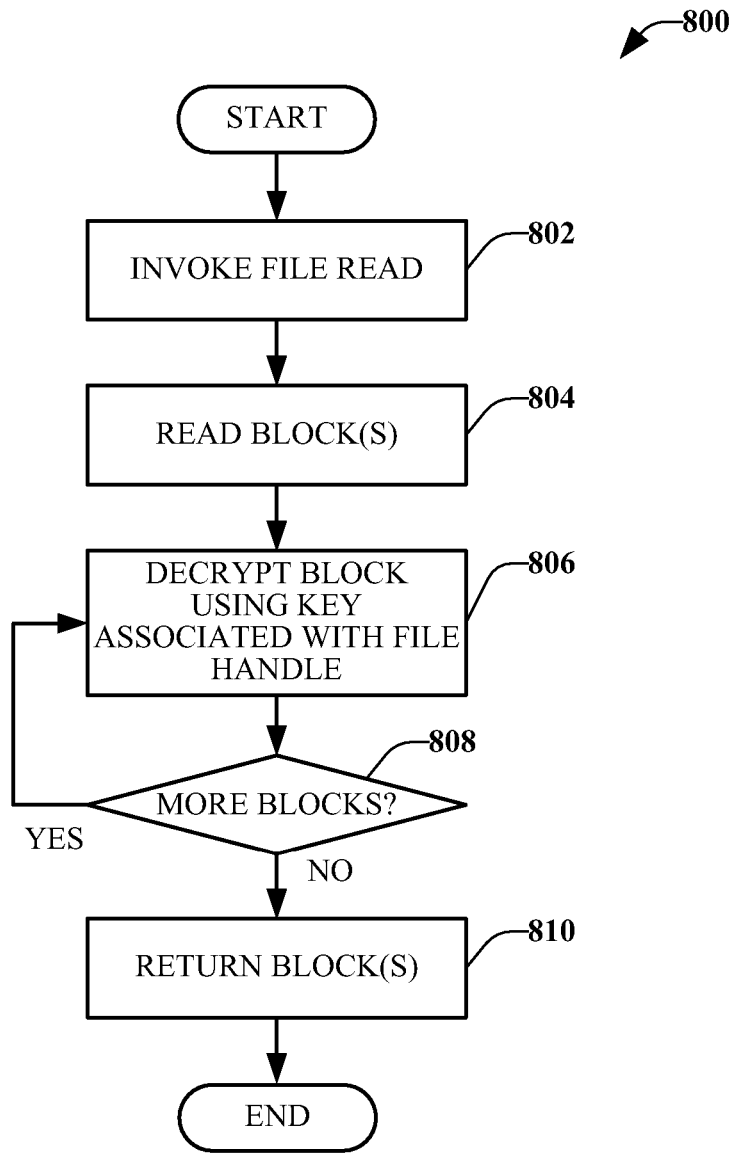
FIG. 8 illustrates a methodology for performing a read operation from an encrypted file in accordance with one or more aspects presented herein.
Figure 9:
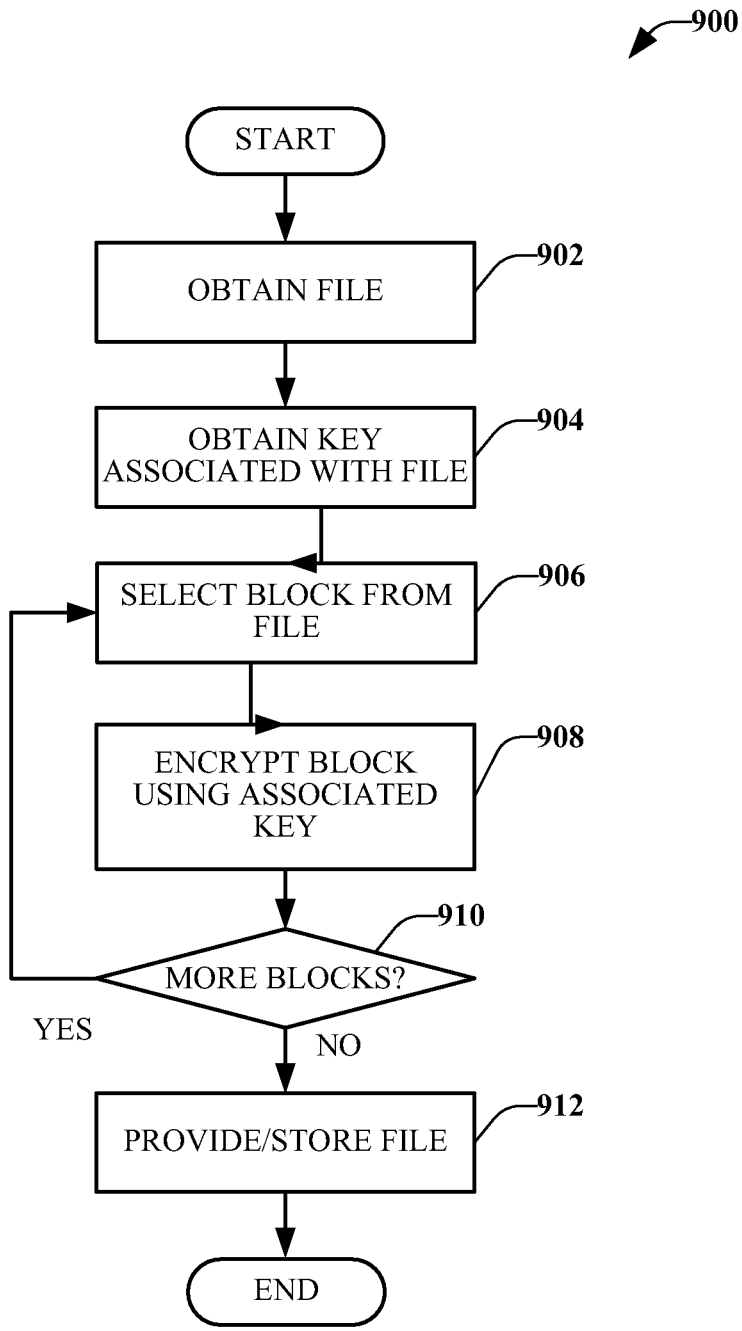
FIG. 9 illustrates a methodology for performing file encryption in accordance with one or more aspects presented herein.

Referring to FIGS. 7-9, methodologies for facilitating encryption and decryption of content are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Referring now to FIG. 7, a methodology 700 for performing file I/O operations for encrypted files is illustrated. At 702, the encrypted file can be opened. Invoking a file open operation can generate a file handle utilized in performing file input/output operations (e.g., FileSeek, FileRead and File-Tell). At 704, a key associated with the file can be obtained. The key can be provided as a parameter of the file open operation. Once provided, the key can be available for use during additional file operations. Parameters for the file open operation may include a key as well as a key length. Key length can be provided as a parameter to allow for modifications in key lengths. For instance, key length can be increased to enhance security.

Once the file is opened, file I/O operations can be performed at 706. File I/O operations can utilize standard formats without requiring programming applications that utilize the operations to manage decryption of files. Once a file has been opened, further file operations can use the file handle without requiring the key. For example, traditional file operations, such as FileTell, FileClose, FileFlush, CheckEndOf-File, GetFileError and IsFileOpen operations only utilize the file handle, and may not require any other parameters for invocation. Additional operations may require further information, but need not require key material. A FileSeek function may require standard parameters such as a handle, an offset and a point of origin within the file from which the offset is marked. Similarly, a FileRead function may include standard parameters such as a file handle, a pointer to a buffer to return read data, amount to be read and the amount actually read from the file.

During read operations, data retrieved from an encrypted file can be decrypted prior to provision to the application that invokes the read operation. Accordingly, file decryption can be transparent to programming applications that read data from encrypted files. Once the application has completed read or any other file I/O operations, the file can be closed at 708.

FIG. 8 illustrates a methodology 800 for performing a read operation from an encrypted file. At 802, a file read operation can be initiated. Operation parameters can include a file handle associated with the file from which data is to be retrieved, a pointer to a buffer into which the retrieved data, and number of blocks or other data elements to retrieve. Although other parameters can be included, decryption key and/or key length were provided during opening of the file and need not be provided as parameters for the read operation. Upon initiation of a read operation the appropriate number of blocks can be read from the file at 804. The appropriate number blocks can be dependent upon the amount of data requested during the read operation.

Data retrieved from the file can be decrypted utilizing the decryption key associated with the file at 806. In particular, if the file has been encrypted based upon block encryption, each block can be separately decrypted. During block encryption files can be partitioned into contiguous data blocks and each block can be individually encrypted. Consequently, during decryption of block encrypted data, each block can be separately decrypted. After a block is decrypted, a determination can be made as to whether there are additional blocks to decrypt at 808. If there are additional blocks, the process can return to 806 where the next block is decrypted. If all retrieved blocks have been decrypted, at 810, decrypted data can be provided to a programming application that initiated the read operation.

Referring now to FIG. 9, a methodology 900 for block encrypting files is illustrated. At 902, a file is obtained for distribution. Files can be supplied by content providers and can be in any format (e.g., MPEG4). A key associated with the file can be obtained at 904. A pre-existing key can be associated with the file or a new key can be generated and associated with the file.

At 906, a block can be selected from the file for encryption. For block encryption, the first block of the file is initially selected. Additional selections retrieve subsequent contiguous blocks. The selected block can be encrypted utilizing the associated key at 908. Any symmetric or asymmetric key encryption algorithm can be use. However, for larger amounts of data, such as media content data files, symmetric key encryption provides significant performance advantages. A determination is made as to whether there are additional blocks of data to encrypt at 910. If there are additional blocks, the process returns to 906, where the next block is selected for encryption. If there are no additional blocks, the encrypted file can be provided or transmitted to one or more user devices at 912. Alternatively, the encrypted file can be stored for later transmission. In addition, the key associated with the file can be provided to user devices to allow decryption. In particular, the decryption key can be encrypted using asymmetric key encryption and provided with the file at time of transmission.

It will be appreciated that, in accordance with one or more embodiments described herein, inferences can be made regarding transmission formats, frequencies, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
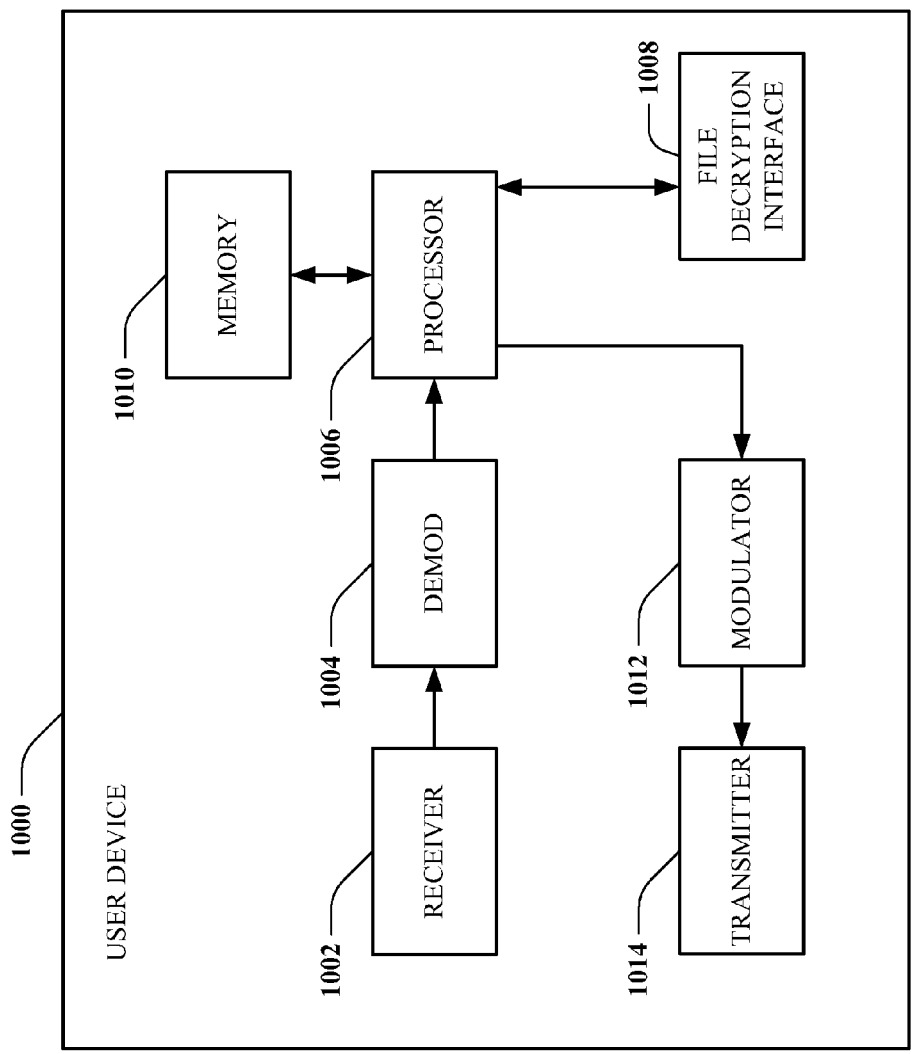
FIG. 10 illustrates a user device utilizing decryption in accordance with one or more aspects presented herein.

FIG. 10 is an illustration of a system 1000 that generates signal requests in a wireless communication environment in accordance with one or more aspects set forth herein. System 1000 can reside in an access point and/or in a user device, as will be appreciated by one skilled in the art. System 1000 comprises a receiver 1002 that receives a signal and from, for instance one or more receive antennas, and performs typical actions thereon (e.g., filters, amplifies, downconverts, etc.) the received signal and digitizes the conditioned signal to obtain samples. A demodulator 1004 can demodulate and provide received pilot symbols to a processor 1006 for channel estimation.

Processor 1006 can be a processor dedicated to analyzing information received by receiver component 1002 and/or generating information for transmission by a transmitter 1014. Processor 1006 can be a processor that controls one or more components of user device 1000, and/or a processor that analyzes information received by receiver 1002, generates information for transmission by a transmitter 1014, and controls one or more components of user device 1000. Processor 1006 can utilize any of the methodologies described herein, including those described with respect to FIGS. 7-9, to coordinate communications. In addition, user device 1000 can include a file decryption interface 1008 that can decrypt content, including video, audio and the like. File decryption interface 1008 may be incorporated into the processor 1006.

User device 1000 can additionally comprise memory 1010 that is operatively coupled to processor 1006 and that can store information related to signal requests, methods for determining signal strength, lookup tables comprising information related thereto, and any other suitable information related to access point selection as described herein. Memory 1010 can additionally store protocols associated with generating lookup tables, etc., such that user device 1000 can employ stored protocols and/or algorithms to select an access point. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1010 of the subject systems and methods is intended to comprise, without being limited to, these and any other suitable types of memory. The processor 1006 is connected to a symbol modulator 1012 and transmitter 1014 that transmits the modulated signal.

Figure 11:
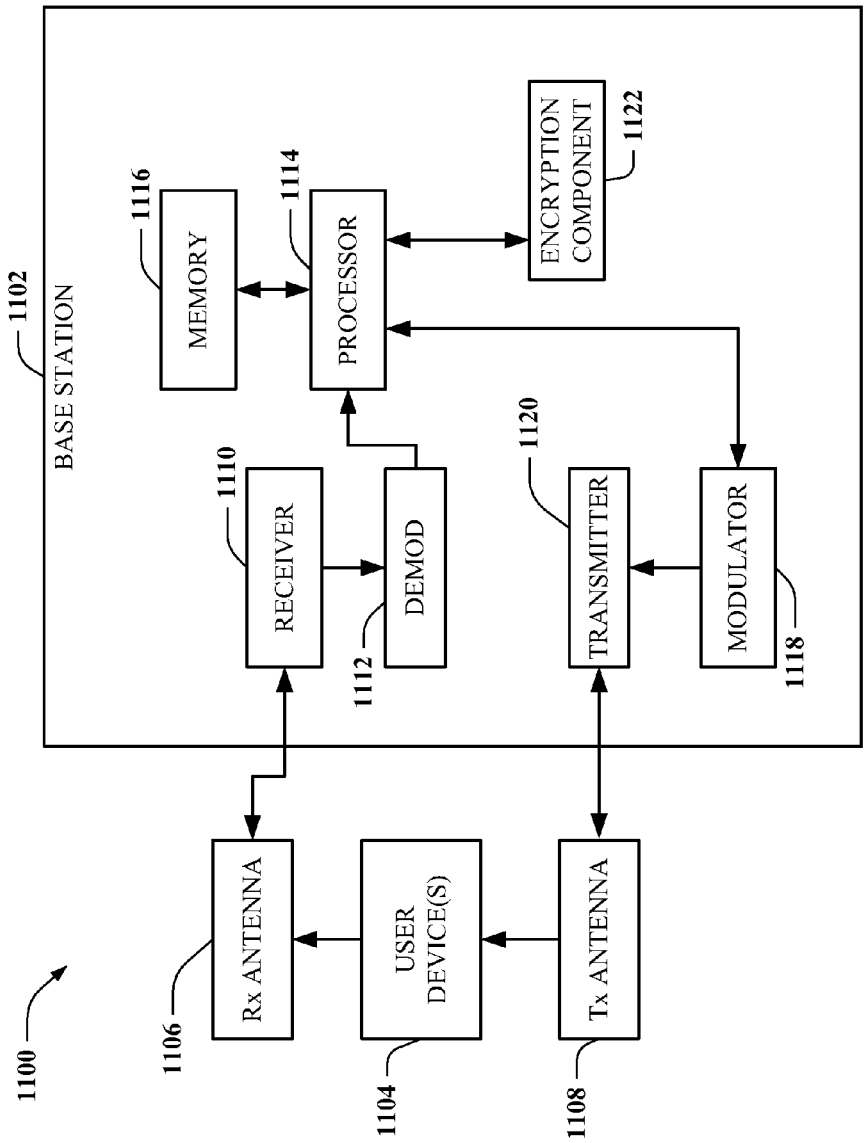
FIG. 11 illustrates a system utilizing encryption in accordance with one or more aspects presented herein.

FIG. 11 is an illustration of a system 1100 that provides for facilitating digital rights management in a communication environment. System 1100 comprises a base station 1102 with a receiver 1110 that receives signal(s) from one or more user devices 1104 via one or more receive antennas 1106, and transmits to the one or more user devices 1104 through one or more transmit antennas 1108. In one or more embodiments, receive antennas 1106 and transmit antennas 1108 can be implemented using a single set of antennas. Receiver 1110 can receive information from receive antennas 1106 and is operatively associated with a demodulator 1112 that demodulates received information. Receiver 1110 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 1114. Processor 1114 can be a processor dedicated to analyzing information received by receiver component 1114 and/or generating information for transmission by a transmitter 1114. Processor 1114 can be a processor that controls one or more components of base station 1102, and/or a processor that analyzes information received by receiver 1110, generates information for transmission by a transmitter 1120, and controls one or more components of base station 1102. Receiver output for each antenna can be jointly processed by receiver 1110 and/or processor 1114. A modulator 1118 can multiplex the signal for transmission by a transmitter 1120 through transmit antennas 1108 to user devices 1104. Modulator 1118 can multiplex a signal for transmission by transmitter 1120 through transmit antenna 1108 to user devices 1104.

Base station 1102 can also include an encryption component 1122. Encryption component can encrypt content prior transmission to user devices 1104. Content can be encrypted using continuous block encryption utilizing any available encryption algorithms.

Base station 1102 can additionally comprise memory 1116 that is operatively coupled to processor 1114 and that can store information related to encryption algorithms, key material and/or any other suitable information related to performing the various actions and functions set forth herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1116 of the subject systems and methods is intended to comprise, without being limited to, these and any other suitable types of memory.

Figure 12:
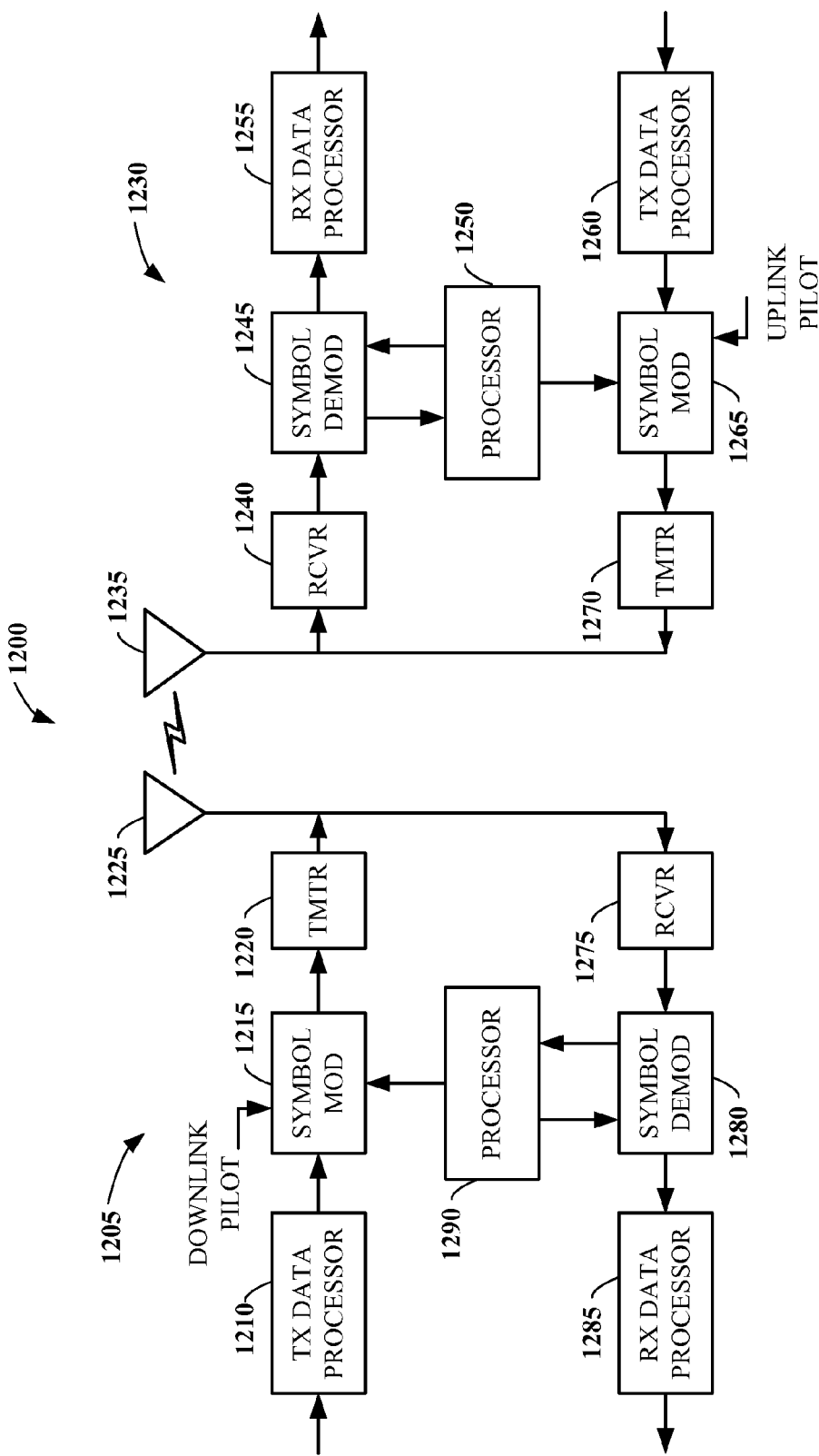
FIG. 12 is an illustration of a wireless communication environment that can be employed in conjunction with the various systems and methods described herein.

FIG. 12 shows an exemplary wireless communication system 1200. The wireless communication system 1200 depicts one base station and one user device for sake of brevity. However, it is to be appreciated that the system can include more than one base station and/or more than one user device, wherein additional base stations and/or user devices can be substantially similar or different from the exemplary base station and user device described below. In addition, it is to be appreciated that the base station and/or the user device can employ the systems and/or methods described herein.

Referring now to FIG. 12, on a downlink, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. Symbol modulator 1215 multiplexes data and pilot symbols and provides them to a transmitter unit (TMTR) 1220. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1220 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1225 to the user devices. At user device 1230, an antenna 1235 receives the downlink signal and provides a received signal to a receiver unit (RCVR) 1240. Receiver unit 1240 conditions (e.g., filters, amplifies, and frequency downconverts) the received signal and digitizes the conditioned signal to obtain samples. A symbol demodulator 1245 demodulates and provides received pilot symbols to a processor 1250 for channel estimation. Symbol demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the uplink, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an uplink signal, which is transmitted by the antenna 1235 to the access point 1205.

At access point 1205, the uplink signal from user device 1230 is received by the antenna 1225 and processed by a receiver unit 1275 to obtain samples. A symbol demodulator 1280 then processes the samples and provides received pilot symbols and data symbol estimates for the uplink. An RX data processor 1285 processes the data symbol estimates to recover the traffic data transmitted by user device 1230. A processor 1290 performs channel estimation for each active user device transmitting on the uplink. Multiple user devices may transmit pilot concurrently on the uplink on their respective assigned sets of pilot subcarriers, where the pilot subcarrier sets may be interlaced.

Processors 1290 and 1250 direct (e.g., control, coordinate, manage, etc.) operation at access point 1205 and user device 1230, respectively. Respective processors 1290 and 1250 can be associated with memory units (not shown) that store program codes and data, including encrypted content (e.g., video, audio, etc.). Processors 1290 and 1250 can utilize any of the methodologies described herein. In particular, processor 1290 can encrypt content prior to transmission to user device 1230 and processor 1250 can utilize the methodologies described herein to decrypt content. Respective Processors 1290 and 1250 can also perform computations to derive frequency and impulse response estimates for the uplink and downlink, respectively.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 13:
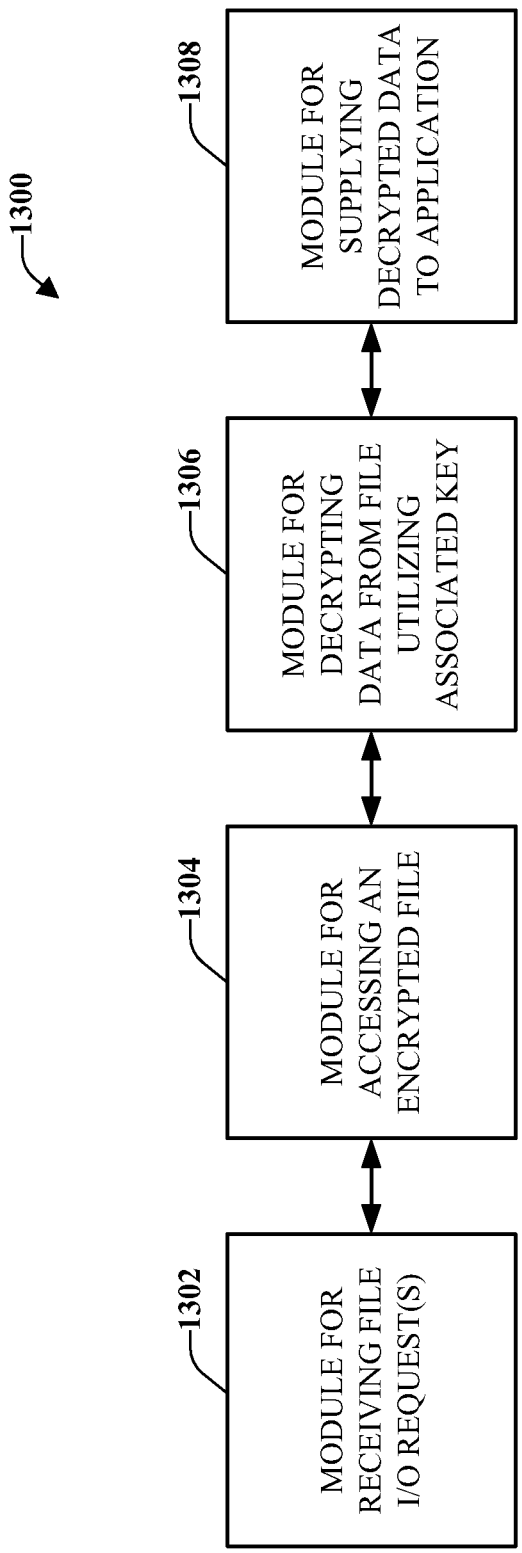
FIG. 13 is an illustration of a system that facilitates file decryption in a wireless communication environment in accordance with various aspects presented herein.

Referring now to FIG. 13, a system 1300 that facilitates digital rights management is illustrated. System 1300 can include a module 1302 for receiving file I/O requests or directives from one or more programming applications (not shown). The received file I/O requests can include standard file I/O operations, such as file open, file read, file close, file seek and the like. System 1300 can include a module 1304 for accessing an encrypted file in response to the received I/O requests. In particular, the access module 1304 can obtain data from an encrypted file in response to a file read request. Access module 1304 actions are dependent upon the received request.

If data is retrieved from an encrypted file, a module 1306 for decrypting data can decrypted the retrieved data utilizing key material associated with the file. In particular, if the file was encrypted using continuous block encryption, blocks of data can be individual decrypted by decryption module 1306. If data has been decrypted, a module 1308 for supplying decrypted data can provide the data to the programming application.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates digital rights management, the method comprising:
    receiving an encrypted file including metadata comprising encrypted key material, wherein the encrypted file is encrypted using continuous block encryption;
    decrypting the metadata to obtain the key material related to the encrypted file;
    receiving a request to open the encrypted file from an application, wherein the request to open the encrypted file comprises the key material and the key material includes a key length;
    generating, in response to the request to open the encrypted file, a file handle referencing the encrypted file;
    associating the encrypted key material related to the encrypted file with the file handle for use in file I/O operations so that the file I/O operations do not require the key material as a parameter of the file I/O operations; and
    performing the file I/O operations as a function of the file handle and the associated encrypted key material, wherein performing the file I/O operations includes:
        receiving a file read request from the application using the file handle;
        obtaining data from the encrypted file as a function of the read request;
        decrypting the obtained data on a block-by-block basis as a function of the encrypted key material associated with the file handle; and
        providing the decrypted data to the application in response to the read request.

2. The method of claim 1, further comprising:
    parsing the file based upon structure of the file to obtain the metadata; and
    analyzing the metadata associated with the file.

3. The method of claim 1, further comprising obtaining the key material from a key manager.

4. The method of claim 1, wherein the file is encrypted using an advanced encryption standard (AES).

5. An apparatus that facilitates digital rights management, comprising:
    a memory that stores an encrypted file, wherein the encrypted file is encrypted using continuous block encryption; and
    a processor that executes instructions for accessing the encrypted file in response to file I/O requests from an application based at least in part upon key material associated with the encrypted file, wherein the processor:
    receives the encrypted file including metadata comprising encrypted key material;
    decrypts the metadata to obtain the key material related to the encrypted file;
    receives a request to open the encrypted file from the application, wherein the request to open the encrypted file comprises the key material and the key material includes a key length;
    generates, in response to the request to open the encrypted file, a file handle referencing the encrypted file;
    associates the encrypted key material related to the encrypted file with the file handle for use in file I/O operations so that the file I/O operations do not require the key material as a parameter of the file I/O operations; and
    performs the file I/O operations as a function of the file handle and the associated encrypted key material, wherein in performing the file I/O operations, the processor:
        receives a file read request from the application using the file handle;
        obtains data from the encrypted file as a function of the read request;
        decrypts the obtained data on a block-by-block basis as a function of the encrypted key material associated with the file handle; and
        provides the decrypted data to the application in response to the read request.

6. The apparatus of claim 5, wherein the encrypted file is encrypted using an advanced encryption standard (AES).

7. The apparatus of claim 5, wherein the file I/O operations include at least one of FileRead, FileClose, FileTell, FileFlush, CheckEndOfFile, GetFileError, or IsFileOpen or combinations thereof.

8. The apparatus of claim 5, further comprising instructions for obtaining the key material from a key manager.

9. The apparatus of claim 5, further comprising instructions for:
    parsing the encrypted file to obtain the metadata associated with the encrypted file; and
    analyzing the metadata.

10. An apparatus that facilitates digital rights management, the apparatus comprising:
    means for receiving an encrypted file including metadata comprising encrypted key material, wherein the encrypted file is encrypted using continuous block encryption;
    means for decrypting the metadata to obtain the key material related to the encrypted file;

means for receiving a request to open the encrypted file from an application, wherein the request to open the encrypted file comprises the key material and the key material includes a key length means for generating, in response to the request to open the encrypted file, a file handle referencing the encrypted file;

means for associating the encrypted key material related to the encrypted file with the file handle for use in file I/O operations so that the file I/O operations do not require the key material as a parameter of the file I/O operations; and means for performing the file I/O operations as a function of the file handle and the associated encrypted key material, wherein the means for performing the file I/O operations includes:

means for receiving a file read request from the application using the file handle;

means for obtaining data from the encrypted file as a function of the read request;

means for decrypting the obtained data on a block-by-block basis as a function of the encrypted key material associated with the file handle; and means for providing the decrypted data to the application in response to the read request.

11. The apparatus of claim 10, further comprising:

means for parsing the file based upon structure of the file to obtain the metadata; and means for analyzing the metadata associated with the file.

12. The apparatus of claim 10, further comprising means for obtaining the key material from a key manager.

13. The apparatus of claim 10, wherein the file is encrypted using an advanced encryption standard (AES).

14. A non-transitory computer-readable medium comprising instructions that upon execution by a processor cause the processor to:

receive an encrypted file including metadata comprising encrypted key material, wherein the encrypted file is encrypted using continuous block encryption;

decrypt the metadata to obtain the key material related to the encrypted file;

receive a request to open the encrypted file from an application, wherein the request to open the encrypted file comprises the key material and the key material includes a key length;

in response to the request to open the encrypted file, generate a file handle referencing the encrypted file;

associate the encrypted key material related to the encrypted file with the file handle for use in file I/O operations so that the file I/O operations do not require the key material as a parameter of the file I/O operations; and perform the file I/O operations as a function of the file handle and the associated encrypted key material, wherein in performing the file I/O operations, the instructions cause the processor to:

receive a file read request from the application using the file handle;

obtain data from the encrypted file as a function of the read request;

decrypt the obtained data on a block-by-block basis as a function of the encrypted key material associated with the file handle; and provide the decrypted data to the application in response to the read request.

15. The non-transitory computer-readable medium of claim 14, further comprising instructions that cause the processor to:

parse the file based upon structure of the file to obtain the metadata; and analyze the metadata associated with the file.

16. The non-transitory computer-readable medium of claim 14, further comprising instructions that cause the processor to obtain the key material from a key manager.

17. The non-transitory computer-readable medium of claim 14, wherein the file is encrypted using an advanced encryption standard (AES).

18. A method that facilitates digital rights management, the method comprising:

receiving an encrypted file including metadata comprising encrypted key material, wherein the encrypted file is encrypted using continuous block encryption;

decrypting the metadata to obtain the key material related to the encrypted file;

receiving a request, comprising a key length, to open the encrypted file from an application, wherein the encrypted file is encrypted using continuous block encryption the request to open the encrypted file comprises the key material and the key material includes a key length;

generating, in response to the request to open the encrypted file, a file handle referencing the encrypted file;

associating the encrypted key material related to the encrypted file with the file handle for use in file I/O operations so that the file I/O operations do not require the key material as a parameter of the file I/O operations; and performing the file I/O operations as a function of the file handle and the associated encrypted key material, wherein performing the file I/O operations includes:

decrypting obtained data from the encrypted file on a block-by-block basis as a function of the encrypted key material associated with the file handle; and providing the decrypted data to the application in response to the read request.

19. The method of claim 18, further comprising:

parsing the file based upon structure of the file to obtain the metadata; and analyzing the metadata associated with the file.

20. The method of claim 18, further comprising obtaining the key material from a key manager.

21. The method of claim 18, wherein the file is encrypted using an advanced encryption standard (AES).

22. An apparatus that facilitates digital rights management, comprising:

a memory that stores an encrypted file, wherein the encrypted file is encrypted using continuous block encryption; and a processor that executes instructions for accessing the encrypted file in response to file I/O requests from an application based at least in part upon key material associated with the encrypted file, wherein the processor:

receives the encrypted file including metadata comprising encrypted key material;

decrypts the metadata to obtain the key material related to the encrypted file;

receives a request comprising a key length to open the encrypted file from the application, wherein the request to open the encrypted file comprises the key material and the key material includes a key length;

generates, in response to the request to open the encrypted file, a file handle referencing the encrypted file;

associates the encrypted key material related to the encrypted file with the file handle for use in file I/O operations so that the file I/O operations do not require the key material as a parameter of the file I/O operations; and performs the file I/O operations as a function of the file handle and the associated encrypted key material, wherein in performing the file I/O operations, the processor:

decrypts obtained data from the encrypted file on a block-by-block basis as a function of the encrypted key material associated with the file handle; and provides the decrypted data to the application in response to the read request.

23. The apparatus of claim 22, wherein the encrypted file is encrypted using an advanced encryption standard (AES).

24. The apparatus of claim 22, wherein the file I/O operations include at least one of FileRead, FileClose, FileTell, FileFlush, CheckEndOfFile, GetFileError, or IsFileOpen or combinations thereof.

25. The apparatus of claim 22, further comprising instructions for obtaining the key material from a key manager.

26. The apparatus of claim 22, further comprising instructions for:

parsing the encrypted file to obtain the metadata associated with the encrypted file; and analyzing the metadata.

27. An apparatus that facilitates digital rights management, the apparatus comprising:

means for receiving an encrypted file including metadata comprising encrypted key material, wherein the encrypted file is encrypted using continuous block encryption;

means for decrypting the metadata to obtain the key material related to the encrypted file;

means for receiving a request, comprising a key length, to open the encrypted file from an application, wherein the encrypted file is encrypted using continuous block encryption the request to open the encrypted file comprises the key material and the key material includes a key length, means for generating, in response to the request to open the encrypted file, a file handle referencing the encrypted file;

means for associating the encrypted key material related to the encrypted file with the file handle for use in file I/O operations so that the file I/O operations do not require the key material as a parameter of the file I/O operations; and means for performing the file I/O operations as a function of the file handle and the associated encrypted key material, wherein the means for performing the file I/O operations includes:

means for decrypting obtained data from the encrypted file on a block-by-block basis as a function of the encrypted key material associated with the file handle; and means for providing the decrypted data to the application in response to the read request.

28. The apparatus of claim 27, further comprising:

means for parsing the file based upon structure of the file to obtain the metadata; and means for analyzing the metadata associated with the file.

29. The apparatus of claim 27, further comprising means for obtaining the key material from a key manager.

30. The apparatus of claim 27, wherein the file is encrypted using an advanced encryption standard (AES).

31. A non-transitory computer-readable medium comprising instructions that upon execution by a processor cause the processor to:

receive an encrypted file including metadata comprising encrypted key material, wherein the encrypted file is encrypted using continuous block encryption;

decrypt the metadata to obtain the key material related to the encrypted file;

receive a request, comprising a key length, to open the encrypted file from an application, wherein the encrypted file is encrypted using continuous block encryption the request to open the encrypted file comprises the key material and the key material includes a key length;

in response to the request to open the encrypted file, generate a file handle referencing the encrypted file;

associate the encrypted key material related to the encrypted file with the file handle for use in file I/O operations so that the file I/O operations do not require the key material as a parameter of the file I/O operations; and perform the file I/O operations as a function of the file handle and the associated encrypted key material, wherein in performing the file I/O operations, the instructions cause the processor computer to:

decrypt obtained data from the encrypted file on a block-by-block basis as a function of the encrypted key material associated with the file handle; and provide the decrypted data to the application in response to the read request.

32. The non-transitory computer-readable medium of claim 31, further comprising instructions that cause the processor to:

parse the file based upon structure of the file to obtain the metadata; and analyze the metadata associated with the file.

33. The non-transitory computer-readable medium of claim 31, further comprising instructions that cause the processor to obtain the key material from a key manager.

34. The non-transitory computer-readable medium of claim 31, wherein the file is encrypted using an advanced encryption standard (AES).

* * * * *